United States Patent Office 2,758,597
Patented Aug. 14, 1956

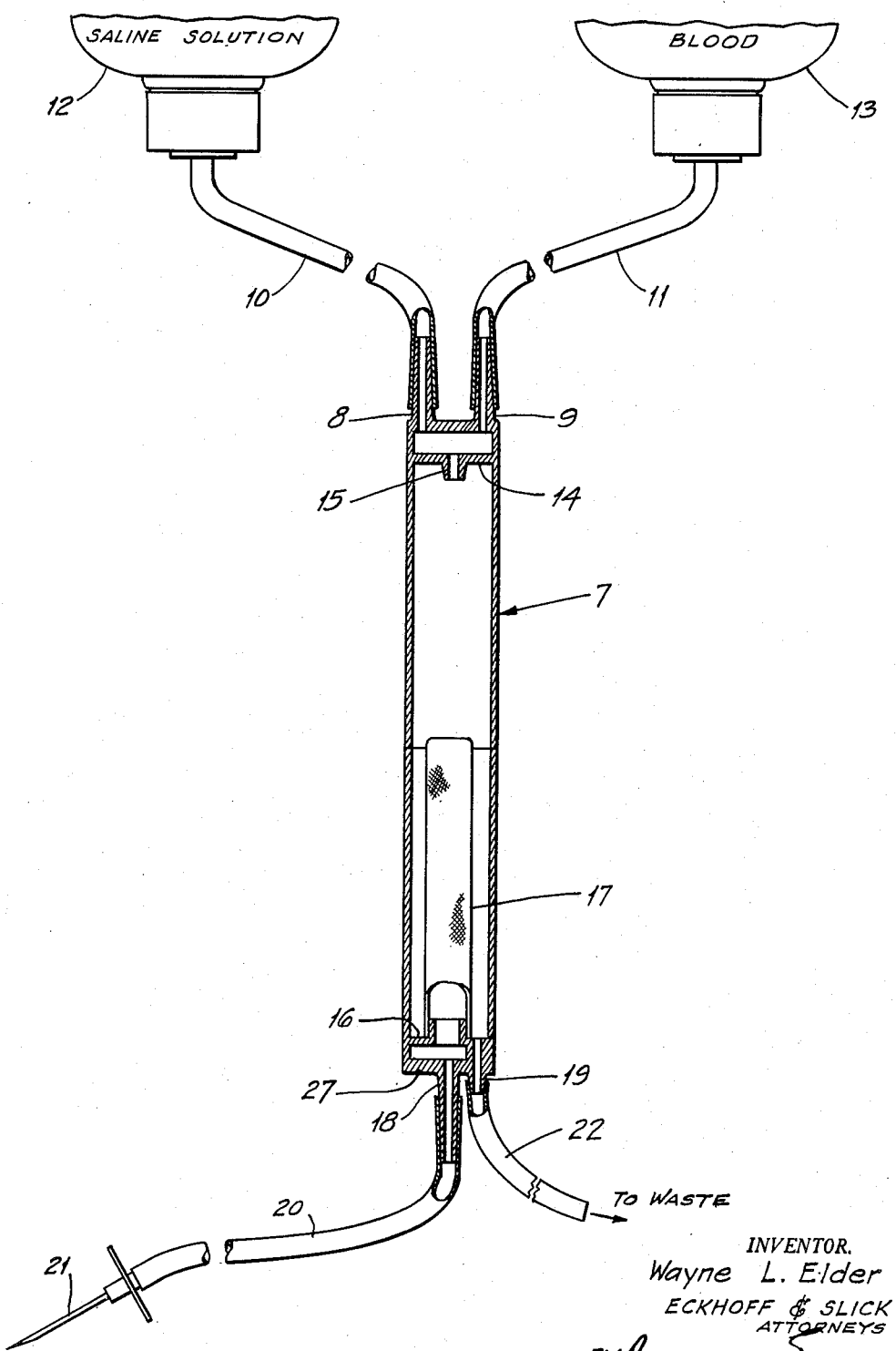

2,758,597

BLOOD TRANSFUSION APPARATUS

Wayne L. Elder, San Pablo, Calif., assignor to Cutter Laboratories, Inc., a corporation of California Application January 24, 1955, Serial No. 483,677

3 Claims. (Cl. 128—214)

This invention relates to blood transfusion apparatus and particularly to apparatus enabling the interference provided during a transfusion by blood slime and blood clots to be overcome.

Blood transfusions are presently more commonly administered by the so-called indirect method as distinguished from the early method of passing blood directly from a donor to a patient. The indirect method involves the storage of the blood of a donor in a flask containing an anti-coagulant solution. Even though an anti-coagulant is utilized, some blood slime and small blood clots persist in forming. As a result, the indirect method has, since its inception, included the use of one or more filter devices to remove any solid particle above a predetermined size inasmuch as the introduction of these into a vein cannot be tolerated. The usual practice has been to discard the complete blood transfusion set-up when the filter has become plugged with fibrinogen particles, blood slime and blood clots. This requires that the transfusion must be interrupted, the plugged transfusion set must be removed from the blood container and from the patient, and an unplugged set substituted and the transfusion started anew. In accordance with this invention, means are provided for removing such clogging solid particles from the filter and for subsequently removing these from the presence of the filter and from the blood transfusion system without dismantling such system.

It is a broad object of the present invention to provide blood transfusion means including a filter which can be freed when and if desired of solid particles collected thereon without disturbing a transfusion.

A further object of the present invention is to provide a novel blood transfusion system, particularly one which includes a filter and means for removing solid particles collected upon the filter.

The invention includes other objects and features of advantage, some of which, together with the foregoing, will appear hereinafter wherein the present preferred form of blood transfusion system and filter are disclosed.

In the drawing accompanying and forming a part hereof, the single figure is a side elevation, partly in section, showing the novel filter and apparatus set-up utilized for giving a blood transfusion in accordance with this invention.

Referring to the drawing, I have shown a drip meter and filter structure, generally indicated at 7, having inlets 8 and 9, these being connected by flexible tubing 10 and 11 respectively to a saline solution in a flask, generally indicated at 12, and to a blood supply in a flask, generally indicated at 13.

The drip meter and filter 7 includes a transparent cylindrical structure with inlets 8 and 9 at one end thereof; a disc 14 is mounted immediately below the inlets 8 and 9, the disc 14 having a depending tube 15 thereon providing a drip meter whereby flow of fluid through the chamber of the drip meter 7 can be observed visually. At its lower end, the drip meter and filter 7 is provided with an annular disc 16 having one or more filter elements 17 mounted thereon; the filter-drip meter can utilize, for example, the structure shown in Cutter Patent 2,644,586. The end of the drip meter-filter 7 is closed by a disc 27 having outlets 18 and 19 thereon. Outlet 18 is connected by a flexible tube 20 to a hollow needle, generally indicated at 21, through which the blood is admitted into the vein of a patient. The other outlet 19 extends from above disc 16 and is connected by a flexible tube 22 to a waste or other receptacle, not shown; outlet 19 thus can act as a by-pass for the filter.

In use, the apparatus set-up is used in the normal manner, that is, blood is permitted to flow from the flask 13 through line 11 and through the drip meter-filter 7 and thence to the patient. When the flow through the filter element 17 is reduced to a rate deemed unacceptable, the flow of blood is shut off by application of a suitable clamping device on lines 11 and 20 and saline solution is permitted to flow through the drip meter-filter structure 7 from flask 12 through line 10 and to waste through by-pass 19 and line 22. If desired, saline solution can be introduced through line 22 and the filter "back-washed" to free the filter from solid particles collected thereon, these being removed through the by-pass 19. By suitably reversing the flow thereafter, the solid particles are removed through line 22. In this manner, the filter can be cleared of solid particles very quickly and without the necessity of substituting another transfusion apparatus.

From the foregoing, I believe it will be apparent that I have provided a novel, simple and improved blood screening device capable of sustained operating capacity by reason of the provision of means for cleaning a filter element of collected solid particles.

I claim:

1. In combination, a source of saline solution, a source of blood, a filter, separate means connecting the source of saline solution and the source of blood to the filter, an outlet from the filter for connection to a patient to receive blood passed through the filter, and a by-pass about the filter for passing to waste solids washed from the filter with saline solution.

2. A blood filter comprising a tubular shell having an inlet and a first outlet, a filter in said shell for filtering blood passed from said inlet to said first outlet, and a second outlet from said shell for removing fluid from said shell without such fluid passing through said filter.

3. A blood drip meter and strainer comprising a cylindrical shell having closures at opposite ends, a pair of separate inlets at one end of the shell, a blood outlet at the other end of the shell, a relatively fine cylindrical strainer positioned in said shell to strain blood flowing to said blood outlet, and an outlet for removing fluid from said shell ahead of said filter.

References Cited in the file of this patent

UNITED STATES PATENTS 2,664,085   Ryan _____ Dec. 29, 1953